(12) United States Patent
Naderi

(10) Patent No.: US 8,146,653 B2
(45) Date of Patent: Apr. 3, 2012

(54) ARTICULATED EXTRACTION PIPE

(75) Inventor: Abdol Hossein Naderi, Poitiers (FR)

(73) Assignee: Euroslot KDSS France, Scorbe Clairvaux (FR)

( * ) Notice: Subject to any disclaimer, the term of this patent is extended or adjusted under 35 U.S.C. 154(b) by 320 days.

(21) Appl. No.: 12/375,989

(22) PCT Filed: Aug. 1, 2007

(86) PCT No.: PCT/IB2007/002202
§ 371 (c)(1),
(2), (4) Date: May 1, 2009

(87) PCT Pub. No.: WO2008/015540
PCT Pub. Date: Feb. 7, 2008

(65) Prior Publication Data
US 2010/0018772 A1    Jan. 28, 2010

(30) Foreign Application Priority Data

Aug. 2, 2006 (FR) ..................... 06 07075

(51) Int. Cl.
*E21B 17/04* (2006.01)
*E21B 43/08* (2006.01)
*F16L 21/05* (2006.01)

(52) U.S. Cl. .............. 166/227; 166/236; 166/242.6; 464/19; 285/146.1

(58) Field of Classification Search .......... 166/227–236, 166/242.1, 242.6, 278; 464/18–20; 285/146.1, 285/146.2, 146.3, 261
See application file for complete search history.

(56) References Cited

U.S. PATENT DOCUMENTS

| 1,886,820 | A | * | 11/1932 | Lee ................................ 175/74 |
| 2,684,581 | A | | 7/1954 | Zublin |
| 2,696,264 | A | * | 12/1954 | Colmerauer et al. .......... 166/235 |
| 3,587,740 | A | * | 6/1971 | Gerwick ........................ 166/278 |
| 3,733,853 | A | | 5/1973 | Sutliff et al. |
| 4,842,059 | A | * | 6/1989 | Tomek .......................... 166/65.1 |
| 4,938,299 | A | | 7/1990 | Jelsma |
| 5,860,864 | A | | 1/1999 | Vukovic |
| 6,203,435 | B1 | | 3/2001 | Falgout, Sr. |

FOREIGN PATENT DOCUMENTS

| EP | 0 853 202 A | 7/1998 |
| FR | 2 268 219 A1 | 11/1975 |

OTHER PUBLICATIONS

International Search Report, International Application No. PCT/IB2007/002202, Mar. 8, 2008, 2 pages, Patrick Dantinne, European Patent Office, P.B. 5818 Patentlaan 2 NL-2280 HV Rijswijk.

* cited by examiner

*Primary Examiner* — Kenneth L Thompson
(74) *Attorney, Agent, or Firm* — Millen, White, Zelano, Branigan, P.C.

(57) ABSTRACT

The invention concerns a bore screen comprising a plurality of perforated rigid tubular modules (1) impermeably connected in series by ball joint means (2), allowing an extracted fluid to flow though all of the elements in series and allowing the consecutive elements to move freely relative to one another, tilting in all directions.

17 Claims, 2 Drawing Sheets

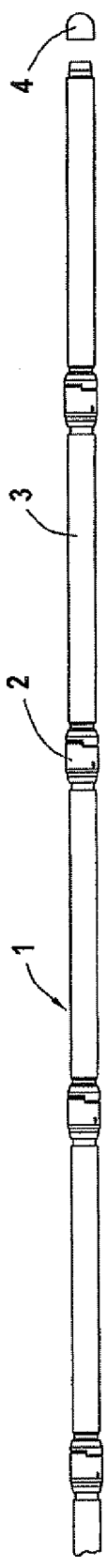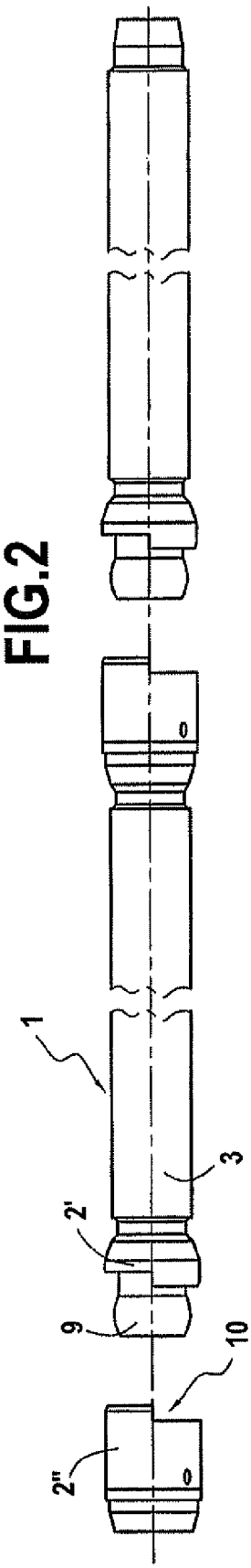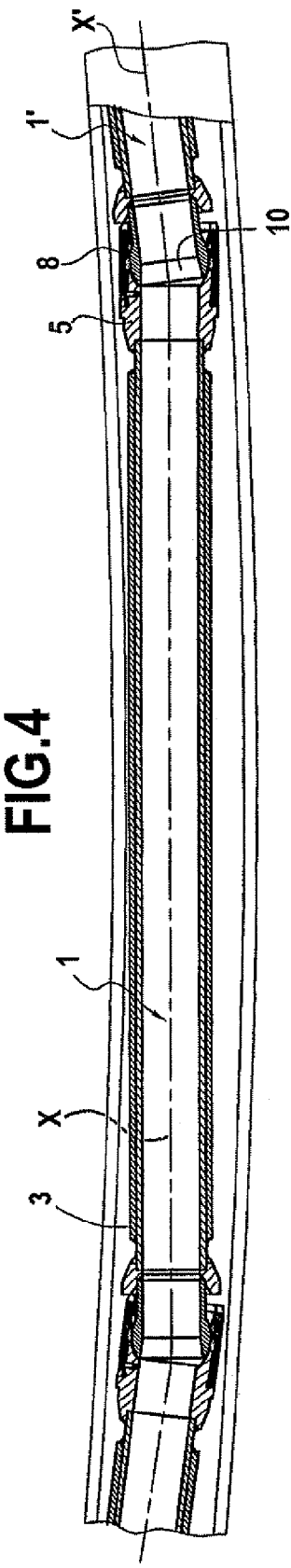

ARTICULATED EXTRACTION PIPE

This invention relates to the design and the production of a drilling strainer.

This strainer is designed in particular for petroleum drilling. It can also be used for any other type of drilling, for example drilling for water or gas, or for any other application where it may be necessary to slide a pipe that comprises a filtering part into an uneven passage, i.e., whereby said passage comprises curved segments and/or bottleneck spouts.

As is done conventionally, the strainers are used in petroleum drilling operations so as to ensure the elimination of the sand that is contained in the hydrocarbon before it rises to the surface. They are generally mounted around rigid perforated tubes that ensure resistance to crushing. Able to be made in various lengths, they then form modules that can be assembled one after the other by means of connecting sleeves so as to constitute a rigid pipe that is installed in the drilling well. This pipe can then be embedded to the bottom of said well so as to reach the drilling layer, which may be found at a depth that ranges up to 10 km.

The drilling wells are generally made essentially rectilinear, perpendicular at ground level or with very slight angles of inclination.

In some cases, and in particular for offshore drilling, it is advantageous from an economic standpoint to carry out several drilling operations from the same platform. So-called deviated drillings are then carried out, i.e., inclined relative to the vertical, straight, or with a very slight curvature. The drilling well then makes it possible to reach only layers that are relatively far from the platform, because it is necessary, taking into account the geometric constraints of the extraction pipe, to travel a great distance before reaching an adequate drilling depth for accessing the layer.

It would be advantageous to be able to reach, from the same stationary platform, layers that are located at different distances around the platform, whereby they can be far away but also close.

The purpose of the invention in particular is to make it possible to reach this objective.

For this purpose, it proposes a drilling strainer that comprises a number of perforated rigid tubular modules that are connected two by two in an airtight manner end to end by ball-joint means that allow an extracted fluid to circulate through all of said modules in series and allow said consecutive modules to move freely relative to one other in tilting travel in all directions. The maximum angle of inclination is advantageously limited so as to ensure that the sealing is maintained at the articulation. These tubular modules also delimit an internal passage pipe with an essentially uniform section over the length of the strainer so as to ensure a minimum pressure drop over the entire length of said pipe.

The strainer according to the invention thus consists of a number of tubular modules that are assembled so as to have all of the degrees of freedom of tilting travel relative to one another and to be individually orientable, although the unit can assume all sorts of configurations in space and in particular the strainer can follow a curved path.

This strainer is designed in particular to be inserted into a drilling tube that is installed in a well. It makes it possible to extract a fluid, liquid or gas, located at the bottom of the drilling well, by filtering it to bring it to the surface.

The fact that the different modules that constitute it move freely relative to one another advantageously makes it possible for the strainer according to the invention to itself assume a shape that is suitable for the part of the drilling tube in which it is found so as to continue its progress into said tube as it is pushed there by a force that is imparted to it from the outside.

The ball-joint means are designed to allow an airtight communication between the successive tubular modules, although the fluid can circulate without interruption from one end to the other within the pipe that is delimited by the strainer according to the invention without the risk that outside particles come to contaminate it or disrupt its flow. The sealing is ensured at each articulation zone so as to prevent any leakage at this location.

The strainer according to the invention can thus advantageously follow curved lines, including with small curvature radii, and can therefore be used not only in rectilinear drilling wells but also in wells of curved shape.

According to an advantageous characteristic of the invention, the strainer is designed so as to be able to follow a curve with a small radius of at least 4 m.

It then makes it possible to access, from the same stationary platform, all of the zones that are close to the platform. In particular, it can advantageously be used for so-called 90-degree drilling, i.e., descending vertically from the platform and then forming a curve with a small radius at the desired drilling depth to continue, in a direction close to horizontal, toward a layer that is present under ground.

The articulation means are preferably advantageously designed to limit the angle of inclination of one module relative to the other in a range of values of between 0 and 30 degrees. This characteristic ensures that the sealing of the articulation means is maintained for all of the relative positions that are accessible from one module relative to the next.

According to an advantageous characteristic of the invention, the strainer also comprises means for making the unit integral with the tubular modules in rotation around the axis of the pipe that it delimits (consisting of the succession of longitudinal axes of the different modules that it comprises), whereby said modules may or may not be inclined relative to one another.

This characteristic advantageously makes it possible to be able to activate the rotation of the entire strainer according to the invention around its axis from one end that is located outside of the well so as to facilitate its passage with force into possible jamming zones in the well.

The strainer according to the invention can thus be adapted to all configurations of the drilling well and can follow all sorts of paths.

Its capacity for adaptation to the shape of the well added to the possibility of maneuvering it in rotation around its axis from the outside make it possible to embed it in the well and to easily remove it even in the case of obstacles inside the well, in particular clogging zones. This is entirely advantageous as much for the curved wells as for the rectilinear wells.

The ball-joint means of the tubular modules of the strainer according to the invention are also advantageously designed to have an outside section that is approximately equal to that of said tubular modules, although the space requirement of the strainer is uniform over its entire length.

In addition, strainer segments can be advantageously produced at the factory by end-to-end assembly of tubular modules between them using ball joint means to obtain lengths that are compatible with the transport (for example on the order of 12 m) while limiting the number of subsequent assembly operations. The segments are then thus transported to the drilling site, and then assembled on one another on site. The strainer according to the invention can then have any length necessary to the implementation of the drilling, conventionally on the order of several kilometers.

According to another advantageous characteristic of the invention, the length of each of the modules and the maximum angle of inclination allowed between two consecutive modules are set jointly based on the maximum curvature to which it is desired to subject the strainer. All of the possible configurations are thus conceivable within the scope of the invention.

According to preferred embodiments in industrial practice, the invention also meets the following characteristics, used separately or in each of their technically operational combinations.

Thus, each of the constituent tubular modules is equipped, at each of its ends, with a smooth, non-perforated tubular end fitting whose axis is combined with the axis of said module. These smooth end fittings advantageously are used as support to different parts of the ball-joint means that make it possible to link the perforated tubular modules to one another to form the strainer according to the invention.

In preferred embodiments of the invention, the ball-joint means comprise in particular an inside ring that is attached coaxially to the smooth end fitting of one of the ends of a first module of a pair of consecutive elements, and an outside ring that is generally cylindrical in shape, coaxially attached to said inside ring so as to form with the latter a receiving cavity for a ball joint that is connected to a second module of the pair. Two annular joints arranged between the ball joint and the inside and outside rings complete the device and ensure its sealing.

In such an embodiment, the ball joint is equipped with a tubular end fitting around which is fixed, coaxially, a connecting sleeve in a generally cylindrical shape, itself able to be placed coaxially on the smooth end fitting of the end opposite the second module.

According to different embodiments of the invention, the connections between the above-mentioned elements (inside ring on the smooth end fitting of the first module, outside ring on said inside ring, connecting sleeve on the ball-joint end fitting and on the smooth end fitting of the second module) can be produced so as to be detachable or not. For example, they can be produced by screwing complementary threaded and tapped parts that are produced on said elements and securing these assemblies by screws or bolts that are radially inserted into the screwed-down zones.

However, according to a preferred embodiment of the invention, these connections are preferably produced by airtight welding, which makes it possible to implement a quick and reliable assembly over time. This is all the more advantageous since the pressure, fairly low on the surface of the ground, can increase to high values (able to go up to 500 bar, for example) by sinking into the depth of the well. By its production and its assembly method, the strainer according to the invention readily withstands such a pressure that is exerted on it.

According to a characteristic of the invention, a space is provided, during the assembly of two consecutive tubular modules, between said connecting sleeve and the outside ring that was previously mentioned, so as to allow the tilting travel of said tubular modules relative to one another. With the respective profiles of said inside and outside rings, this space participates in the determination of the maximum relative angle of inclination between two consecutive tubular modules of the strainer according to the invention. It is defined based on the final configuration that it is desired to provide to said strainer.

It should be noted, however, that the above-mentioned space between the outside ring and the connecting sleeve can trap certain particles, and in the long run can limit the relative movements of two consecutive modules, thus reducing the flexibility and the performance levels of the strainer according to the invention.

So as to remedy this drawback, a flexible sheath is advantageously placed in an airtight manner around the connecting zone between said connecting sleeve and said outside ring so as to insulate said space from the outside environment of the strainer according to the invention.

According to another characteristic of the invention, and as it was mentioned above, the ball-joint means make it possible to activate the rotation of the entire strainer according to the invention around its axis from one of its ends.

For this purpose, the outside ring and the connecting sleeve that are mentioned above have complementary shapes that can, once the ball joint has been assembled, mate together and mutually be driven in rotation when one of the thus articulated modules is driven in rotation around its axis.

A rotational movement on itself, imparted to one of the modules of the strainer according to the invention, is thus transmitted to the next module. The same holds true, in succession, for all of the successive modules, so that when one of said modules is activated in rotation around its axis, in particular an end module that is arranged outside of the drilling well, the entire strainer undergoes the same movement.

Advantageously, the centering means of the strainer according to the invention in the drilling tube that is designed to accommodate it are also arranged around the ball-joint means that are described below.

According to a preferred embodiment of the invention, these centering means are formed by a set of spring leaves that are uniformly distributed around said articulation means. Advantageously, each of said leaves rests, at one of its ends, on the outside periphery of said articulation means, and, at its opposite end, on a ring that is common to all of said leaves and able to slide around one of the two tubular modules that are articulated with one another by said articulation means or around one of the ends of said articulation means.

These centering means make it possible to guide the strainer according to the invention into the drilling tube such that it remains in the shaft of said tube, thus promoting the efficiency of the filtration carried out by said strainer and the movements of the latter within said tube.

It should be noted that, according to different embodiments of the invention, said centering means can be placed on each of the articulations of the strainer, or on only some of said articulations, in particular based on the drilling well profile and, therefore, on the final configuration desired for the strainer according to the invention.

According to different embodiments of the invention, each of the tubular modules can consist of a perforated rigid tube whose perforation density corresponds to the desired filtration performance levels or can be formed by a perforated rigid tube that is equipped with a metal fabric that is attached in an airtight manner around its outside surface.

Furthermore, it should be noted that according to particular embodiments of the invention, only the tubular modules that are brought to be placed at the bottom of the drilling well can be perforated, whereby the same means make it possible to articulate between them, two by two, the tubular modules of the strainer according to the invention, whereby the latter may or may not be perforated.

The invention will now be completely described within the framework of preferred characteristics and advantages thereof by referring to FIGS. 1 to 5 of this description in which:

FIG. 1 shows a side view of a segment of the strainer according to the invention;

FIG. 2 illustrates the pipe of FIG. 1 with the tubular modules detached from one another, in side view;

Figure 3:
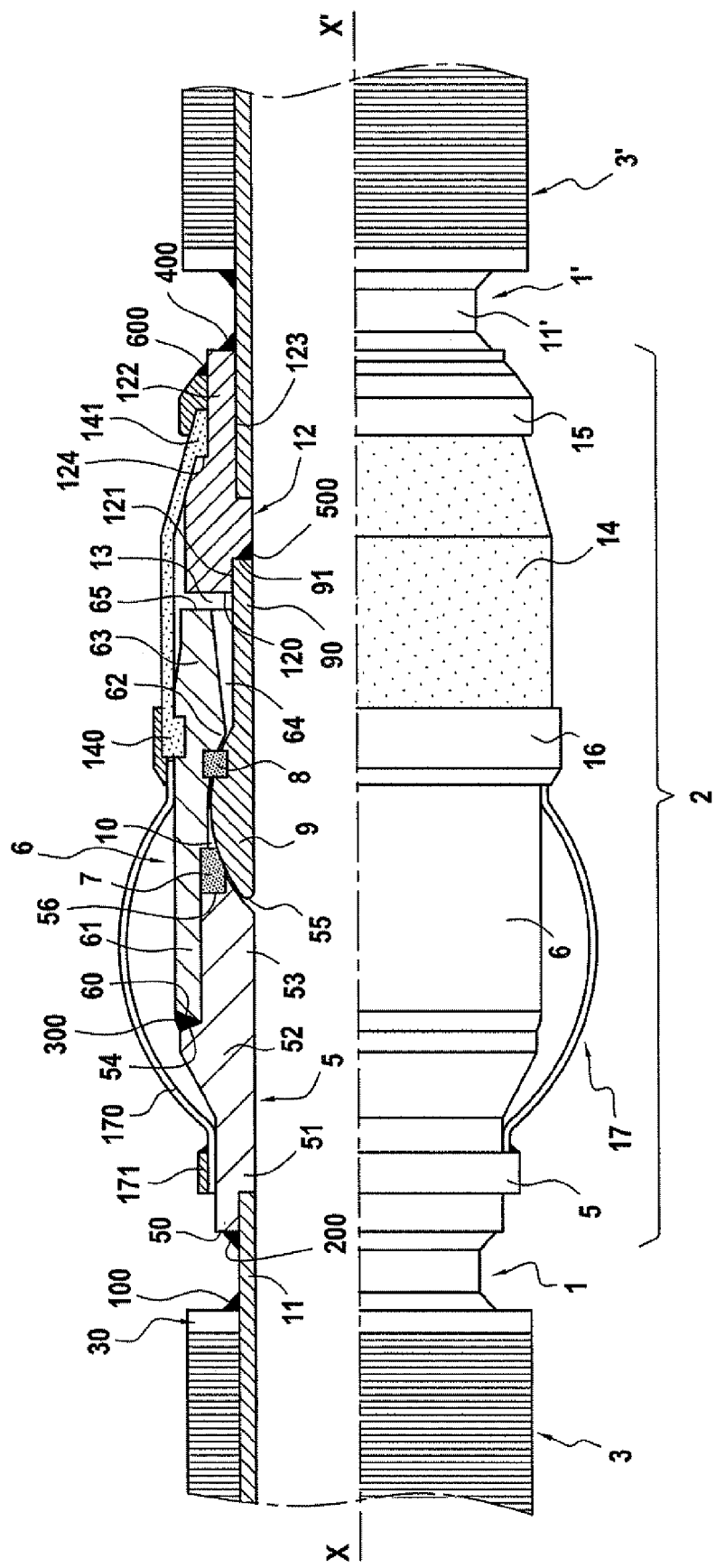
FIG. 3 shows a half-section view along a longitudinal plane of a segment of the strainer of FIG. 1, including the ball-joint means that it comprises.

and FIG. 4 shows a cutaway view along a longitudinal plane of a segment of the strainer of FIG. 1, with the tubular modules that are inclined relative to one another.

The strainer according to the invention is shown partially in FIG. 1. It comprises a number of successive perforated tubular modules 1 that are connected in series to one another by articulation means 2.

The tubular modules 1 can be identical or different. In particular, it is possible to provide that they have a decreasing diameter by going toward the end of the strainer that is designed to sink to the bottom of the well during drilling, such that said strainer can thus penetrate increasingly narrow drilling tubes.

Likewise, it is possible to provide that all of the tubular modules 1 be perforated, or that only said modules that are designed to be placed at the bottom of the drilling well be perforated.

In addition, according to different embodiments of the invention, the perforated tubular modules can be rigid tubes whose perforation density meets the desired filtration performance levels or can consist of perforated rigid tubes that are equipped with a metal fabric 3 that is attached in an airtight manner to their outside surface.

In this case, for its assembly, each strainer 3, advantageously equipped with a smooth ring 30 at each of its ends, is slipped on around a tubular module 1, and then it is attached, by an airtight welding bead 100, at its end rings 30, to the outside face of said tubular module 1, so as to leave free, at each end of the latter, a smooth end fitting 11 (see FIG. 3).

In any case, each of said tubular modules 1 comprises, at each of its ends, a smooth end fitting 11, not perforated, designed for the airtight attachment of said tubular module 1 to the different elements of the attachment means 2.

The tubular modules 1 are produced in materials that are suitable for the particular use of the strainer according to the invention, in particular in steel for the petroleum drilling. The same holds true for the articulation means 2 that connect the successive modules two by two.

A cap 4 is provided to close the end of the first module that will be inserted into the well, so as to force the fluid to pass only into the strainer.

The tubular modules 1 are shown detached from one another in FIG. 2. Each of said modules 1 is shown there attached at one of its ends to a first part 2' of the articulation means 2 and at the opposite end to a second cooperating part 2" of these means. The first part 2' comprises the ball joint 9 and the second part 2" comprises a receiving cavity 10 of this ball joint.

The cooperating parts 2' of a module 1 and 2" of the following module are assembled with one another in the normal configuration of use.

The articulation means 2 are shown in more detail in FIG. 3. They connect two tubular modules 1 and 1', which will be defined as a front module and a rear module, by going from left to right in the figure.

They comprise an inside ring 5 that is attached, at its front end 50, around the smooth rear end fitting 11 of the tubular module 1. According to the preferred embodiment of the invention presented by the figures, the connection between said rear smooth end fitting 11 and the inside ring 5 is carried out by means of an airtight welding bead 200.

The inside ring 5, whose axis of revolution X is combined with that of the tubular module 1, is formed by an essentially cylindrical front part 51, a tapered intermediate part 52 that extends said front part 51 by flaring toward the rear of the ring 5, and an essentially cylindrical rear part 53 that extends said tapered part 52 and whose outside diameter is less than the rear diameter of the latter. Said tapered part 52 and rear part 53 thus form, at their intersection, a shoulder 54 that can receive at rest the front end 60 of an outside ring 6 that will be presented in more detail later.

Advantageously, the inside diameter of the ring 5, in its front part, is equal to the inside diameter of the tubular module 1 or very close to the latter so as to define a constant passage section for the extracted fluid. According to a characteristic of the invention, this inside diameter uniformly increases close to the rear end of said inside ring 5, whereby the latter thus exhibits a tapered profile 55 close to said end. According to the invention, the angle at the top of said frustrum of cone is defined such that said profile 55 is able to be placed approximately tangentially against the front part of the ball joint 9.

The articulation means 2 also comprise an outside ring 6 whose outside diameter is equal to the outside diameter of the tubular modules 1 and 1' to be articulated with one another or very close to the latter. The inside diameter of the front part 61 of the outside ring 6 is slightly greater than the outside diameter of the rear part 53 of the inside ring 5, such that said front part 61 can be slipped on around said rear part 53 over the entire length of the latter.

The inside ring 5 and outside ring 6 thus define a cavity 10 for accommodating the ball joint 9.

This ball joint, axially pierced by an opening whose diameter is approximately equal to the inside diameters of modules 1 and 1' to be articulated with one another, is extended in its rear part by a cylindrical ball-joint end fitting 90, whose inside diameter is equal to that of the axial opening of said ball joint 9 and whose outside diameter is less than the outside diameter of said ball joint.

Advantageously, the inside wall of the outside ring 6 forms a lip 62 whose diameter is greater than the outside diameter of the ball-joint end fitting 90 and less than the outside diameter of the ball joint 9. According to the invention, said lip 62 is able to be placed, when the articulation means 2 are assembled, at the intersection of said ball joint 9 and said ball-joint end fitting 90. The result is that the ball joint 9, once positioned in its holding cavity 10, can only be extracted by the disassembly of the articulation means 2. According to a preferred embodiment of the invention, the lip 62 is attached to the front part of the inside wall of the cavity 10 along an essentially spherical profile corresponding to the outside shape of the ball joint 9.

Furthermore, according to a characteristic of the invention, the rear part 63 of the outside ring 6 has a tapered inside profile 64 that flares toward the rear end 65 of said ring. This profile participates, as it will be specified later, in the displacement of the ball-joint end fitting 90 during the rotational movements of the ball joint 9 around axes that are different from the longitudinal axis X of the tubular module 1.

According to the invention, during the assembly of the articulation means 2, the outside ring 6 is attached to the inside ring 5 at its front end 60 that rests, as it has been specified above, on the shoulder 54 of said inside ring 5. According to the preferred embodiment of the invention that is presented by the figures, this assembly is carried out by means of an airtight welding bead 300.

Two annular seals 7 and 8 are furthermore arranged between the inside surface of the outside ring 6 and the outside surface of the ball joint 9 so as to ensure the sealing between these two parts without disturbing their relative movements. These seals are advantageously bonded in grooves that are provided for this purpose in the inside wall of the outside ring 6, and they come into contact with the ball joint 9 that crushes them.

Advantageously, one of said seals, referenced at 7 in FIG. 3, also comes into contact with the rear end 56 of the inside ring 5 and is thus compressed when the front end 60 of the outside ring 6 rests on the shoulder 54 of the inside ring 5 around which said outside ring is placed, thus ensuring the sealing of contact at the intersection of the three parts, which are the outside ring 6, the inside ring 5, and the ball joint 9.

As it was mentioned above, the articulation means 2 of the strainer according to the invention comprise, in addition to the inside ring 5 and the outside ring 6 and the ball joint 9, a connecting sleeve 12 that makes it possible to connect said ball joint 9 to the smooth end fitting 11' of the tubular module 1' that is to be articulated with the tubular module 1.

According to the invention, the connecting sleeve 12, whose axis of revolution is combined with the axis X' of the tubular module 1', comprises, in its rear part 122, a coaxial machining 123 that can accommodate by an interlocking arrangement, over its entire length, the above-mentioned smooth end fitting 11', thus producing the connection of said sleeve 12 with the tubular module 1'. According to the preferred embodiment of the invention that is presented by the figures, an airtight welding bead 400 allows this connection to be made integral.

Furthermore, in its front part, the connecting sleeve 12 comprises a counterbore 121 that makes it possible to shrink-on coaxially around the rear part of the ball-joint end fitting 90, whereby the rear end 91 of the latter rests on the bottom of said counterbore 121. According to the preferred embodiment of the invention that is presented by the figures, an airtight welding bead 500 is made between said rear end 91 of the welding end fitting 90 and the bottom of the counterbore 121 to make integral said connecting sleeve 12 with the ball joint 9.

It should be noted that, according to the configuration shown by FIG. 3, the X' and X axes respectively of the tubular modules 1' and 1 are combined, whereby said perforated tubular modules 1' and 1 are aligned with one another. When a curve is imparted to the strainer according to the invention, said axes X' and X are no longer combined: said X axis is common to the tubular module 1, the inside ring 5, and the outside ring 6, and said X' axis is common to the tubular module 1', the connecting sleeve 12, and the ball joint 9 that is equipped with its end fitting 90, whereby the angle of inclination between said elements 1 and 1' is obtained with a rotational movement of the ball joint around an axis that is perpendicular to said X and X' axes.

According to an important characteristic of the invention, the depth of the counterbore 121 is defined such that it makes it possible to provide, during the installation of said connecting sleeve on the ball-joint end fitting 90, a space 13 between the front end 120 of the connecting sleeve 12 and the rear end 65 of the outside ring 6.

In combination with the rear inside tapered profile 64 of said outside ring and the rear inside tapered profile 55 of the inside ring 5, the space 13 makes possible the displacement of the ball-joint end fitting 90 during movements of the ball joint 9 around axes that are not combined with the X' axis of the tubular module 1'. It then clearly appears that said space 13 and said tapered profiles 64 and 55 also make it possible to limit this displacement and thus the relative angular displacement of the tubular module 1' relative to the tubular module 1. According to a preferred embodiment of the invention, said space 13 and said tapered profiles 64 and 55 are defined so as to allow a maximum relative angular displacement of 60 degrees between said perforated tubular modules 1 and 1'. This displacement makes it possible in particular to ensure the sealing ensured by the above-mentioned joints 7 and 8.

The invention as it has just been described therefore makes it possible to produce a pipe that comprises several perforated tubular modules that are articulated end to end with one another, and whose articulation means are airtight with regard to the outside, using welding beads that connect the different articulation means with one another and with the above-mentioned seals 7 and 8.

It seems, however, that outside particles can be trapped within the space 13, being able to result in limiting the possibilities of displacement of the ball-joint end fitting 90 and thus compromising the flexibility of the strainer according to the invention.

To remedy this drawback, the invention provides for placing, around the connecting sleeve 12 and the outside ring 6, a flexible sheath 14, for example produced in a plastic material or elastomer whose mechanical and thermal characteristics are compatible with the chemical and physical environment in which the strainer according to the invention is brought to be placed.

Advantageously, said flexible sheath 14 comprises, at its front and rear ends, respectively one lip 140 and one lip 141 that can be inserted into suitable grooves made respectively in the outside wall of the outside ring 6 and in the outside wall of the connecting sleeve 12. The flexible sheath 14 thus covers the space 13, insulating the outside environment from the strainer according to the invention and preventing any particle from penetrating therein.

According to the preferred embodiment of the invention that is presented in FIG. 3, the rear lip 141 is produced at the rear end of the flexible sheath 14 and can rest against a shoulder 124 that is formed on the outside wall of the connecting sleeve 12. The cooperating parts of the lip 141 and the shoulder 124 are advantageously oriented toward the rear of the sleeve 12 so as to place the flexible sheath 14 in longitudinal extension during its positioning.

It should be noted that the limitation of the relative maximum angle between two successive tubular modules, by also limiting the maximum extension of the flexible sheath 14, makes it possible to ensure the mechanical hold of the latter.

To ensure the holding of the flexible sheath 14, a locking ring 15 is then advantageously slipped on around the rear part of the connecting sleeve 12 and the rear part of the lip 141. According to the preferred embodiment of the invention presented by FIG. 3, an airtight welding bead 600 makes it possible to make integral said connecting sleeve 12 and said locking ring 15 once the latter is installed as mentioned above.

At the opposite end of the flexible sheath 14, a protective ring 16 makes it possible, in an analogous manner, to hold the front part of said flexible sheath in position. From the greater outside diameter to the outside diameter of the flexible sheath 14, the protective ring 16 also makes it possible to avoid any contact (in particular by friction) against the latter, which is relatively fragile mechanically, and the walls of the drilling tube able to receive the strainer according to the invention, a contact that could damage, in the long run, said flexible sheath and then permit the passage of particles into the space 13 that was mentioned above.

In this sense, the invention also provides means 17 that make it possible to ensure an effective and reproducible centering of the strainer in the drilling tube that accommodates it.

The centering means 17 also make it possible to remove said flexible sheath 14 from said walls and therefore contribute to its protection.

According to the preferred embodiment of the invention that is presented by the figures, the centering means 17 comprise a set of curved spring leaves 170 that are uniformly distributed over the outside periphery of the articulation means 2.

Advantageously, said spring leaves 170 are each, at their front end, attached by welding to a ring 171 that is common to them, and, at their rear end, inserted between the outside diameter of the outside ring 6 and the protective ring 16 that is mentioned above. Advantageously, the inside diameter of said ring 171 is slightly greater than the outside diameter of the front part 51 of the inside ring 5, although it can slide freely around the latter when the spring leaves 170 are crushed.

The invention thus makes it possible to produce an articulated drilling strainer, whose articulation zones are sealed against outside particles and therefore are not subject to jamming by said particles, whereby said strainer can be kept centered within the drilling tube into which it can be inserted.

According to another important characteristic, the strainer according to the invention can be driven in rotation around its axis by action on a single one of the tubular modules that constitute it.

For this purpose, the outside ring 6 and the connecting sleeve 12 that are described above are equipped, respectively at their rear end 65 and front end 120, with complementary shapes (not shown in FIG. 3) that can work with one another and mutually drive in rotation when the articulation means 2 are assembled. Advantageously, said complementary shapes are sized so as to limit as much as possible the restriction that they can induce in the displacement of the ball-joint end fitting 90 during movements of the ball joint 9. By way of nonlimiting example, said complementary shapes can thus consist of a set of pieces that are uniformly distributed on the surface of said ends and able to come into mutual contact when a rotational movement around its axis is imparted to one of the tubular modules 1 or 1'. The rotation of one of the tubular modules 1 or 1' around its axis of revolution then drives the other module in rotation around its axis of revolution, and regardless of their relative positions, only the pieces of the closest surfaces are then in mutual contact.

The unit can, by way of nonlimiting example, be produced in the following way.

The tubular modules 1 and the different parts that constitute the articulation means 2 and the centering means 17 are produced at a factory. The assembled articulation means 2 are then attached between the successive modules 1 so as to assemble the latter two by two and end to end. To do this, the outside ring 6, equipped with joints 7 and 8, is first of all positioned around the ball joint 9. The unit that is formed by these two elements is then connected and welded, on the one hand, to the inside ring 5, and, on the other hand, to the connecting sleeve 12. The thus assembled articulation means are then attached and welded respectively to the smooth end fitting 11 of the tubular module 1 and to the smooth end fitting 11' of the tubular module 1'. The flexible sheath 14 then can be installed around the connecting sleeve 12 and the rear part of the outside ring 6 so as to protect the space 13 that is described above. The installation of the flexible sheath 14 is then completed by the insertion and the welding of the locking ring 15 around the outside part of the sleeve 12 and by the installation of the protective ring 16. The centering means 17 are finally installed as it was described above around assembled articulation means 2.

The strainer segments thus produced are then assembled one after the other in the workshop according to the required length (generally 6 to 12 m) and then are sent to the drilling site.

The operation is repeated as often as necessary so as to assemble the desired strainer lengths.

As shown in FIG. 4, the tubular modules 1 and 1', which are connected by the articulation means 2 according to the invention, can be inclined relative to one another, depending on the play allowed by the space 13 and by tapered profiles 64 and 55 that are mentioned above. This is carried out by pivoting the ball joint 9 inside its accommodating cavity 10.

The strainer in its entirety can thus assume a curved shape.

In addition, thanks to the presence of cooperating complementary shapes of the front end 120 of the connecting sleeve 12 and the rear end 65 of the outside ring 6, a rotational movement imparted to one end of the strainer is automatically sent to the set of modules that constitute it, although it is possible to maneuver said strainer in rotation on itself from the outside of the well to facilitate its passage into clogged zones.

The embodiment of the strainer according to the invention, and in particular the attachment of its different constituent modules to one another, also makes it possible to withstand significant constraints, such as may be encountered during petroleum drilling operations.

The preceding description clearly explains how the invention makes it possible to achieve the objectives that it has set. In particular, it provides an articulated strainer that is particularly useful in the drilling field, which has a large capacity for self-adaptation to the shape of the well, which can follow paths with a small curvature radius, which forms a unit that is rigid in rotation around its axis, making it possible for it to be maneuvered into this movement from the outside of the well, and which provides over its length a passage section for the uniform extracted fluid.

Nevertheless, as the foregoing indicates, the invention is not limited to the implementations that have been specifically described and shown in the figures, and indeed it extends to any variant that employs equivalent means.

The invention claimed is:

1. A drilling strainer comprising a number of perforated rigid tubular modules (1) connected two by two in an airtight manner end to end by ball-joint articulation means (2) that allow an extracted fluid to circulate through all of said tubular modules in series and allow said consecutive modules to move freely relative to one other in tilting travel in all directions, and means to make integral all of said tubular modules (1) in rotation around the central axis of said strainer, formed by all of the axes of said tubular modules (1), further comprising engagement means comprising, for each pair of two consecutive modules (1, 1') of the series, complementary shapes provided at the ends respectively opposite a connecting sleeve (12) and an outside ring (6), respectively attached to the ends of said modules (1, 1') that are designed to be articulated by said articulation means (2), whereby said complementary shapes are arranged so as to cooperate with one another for mutual driving in rotation when a rotational movement around its axis (X, X') is imparted to one of said modules (1, 1').

2. A drilling strainer according to claim 1, wherein said articulation means (2) are adapted to limit the angle of inclination of one module (1) relative to the other in a range of 0 to 30 degrees.

3. A drilling strainer according to claim 1, wherein said outside ring (6) and said connecting sleeve (12) are spaced from one another by an interval (13) that allows the tilting travel of one module (1) relative to the other and that determines the maximum angle of inclination between two consecutive modules (1, 1').

4. A drilling strainer according to claim 3, wherein a flexible sheath (14) is placed simultaneously around one part (63) of the outside ring (6) and around a part (120) of the connecting sleeve (12) so as to insulate said space (13) from the environment in which said strainer is placed.

5. A drilling strainer according to claim 4, wherein said flexible sheath (14) is held in place, at one of its ends, by means of a locking ring (15) that is attached around said connecting sleeve (12) and inserted around a lip (141) of said flexible sheath, and, at its opposite end, by means of a protective ring (16), inserted around a lip (140) that it comprises and around the outside ring (6).

6. A drilling strainer according to claim 1, having means to follow a curve with a small radius of at least 4 m.

7. A drilling strainer according to claim 1, comprising both perforated tubular modules and non-perforated tubular modules, and wherein said perforated tubular modules are adaptable to be placed at the bottom of a drilling well.

8. A method of using the drilling strainer according to claim 1, comprising employing said drilling strainer for drilling petroleum.

9. A drilling strainer comprising a number of consecutive perforated rigid tubular modules (1) connected two by two in an airtight manner end to end by ball-joint articulation means (2) comprising a ball joint (9) that allow an extracted fluid to circulate through all of said tubular modules in series and allow resultant consecutive modules to move freely relative to one other in tilting travel in all directions, wherein said articulation means (2) comprise an inside ring (5) that is attached at one end of a first module (1) of a pair of consecutive modules, and an outside ring (6) that is attached to said inside ring (5) so as to form, with the latter, a receiving cavity (10) for the ball joint (9) of said articulation means (2) that is connected to a second module (1') of said pair, and further comprising two annular seals (7, 8) arranged between said ball joint (9) and said outside ring (6).

10. A drilling strainer according to claim 9, wherein said ball-joint articulation means (2) comprises a ball-joint end fitting (90) by which it is attached to said second module (1') by means of a connecting sleeve (12) and wherein said connecting sleeve (12) and the outside ring (6) have complementary shapes adapted to work with one another around said ball-joint end fitting (90) with a play (13) that allows the monitoring of the tilting travel of the modules relative to one another.

11. A drilling strainer according to claim 9, wherein said inside ring (5) and said outside ring (6) are attached to one another by cooperating peripheral threaded zones and by transverse screws adapted to neutralize the forces of traction and/or compression exerted on said threaded zones.

12. A drilling strainer according to claim 9, wherein said inside ring (5) and said outside ring (6) are attached to one another by an airtight welding bead (300).

13. A drilling strainer comprising a number of perforated rigid tubular modules (1) connected two by two in an airtight manner end to end by ball-joint articulation means (2) that allow an extracted fluid to circulate through all of said tubular modules in series and allow said consecutive modules to move freely relative to one another in tilting travel in all directions and further comprising centering means (17) in a drilling tube adapted to accommodate it, whereby said centering means (17) are formed by a set of spring leaves (170) that are uniformly distributed on the periphery of the articulation means (2) and connected, at one of their ends, to a common ring (171) that can slide around the end of a perforated tubular module (1), whereby the opposite end of said spring leaves (170) is connected to said articulation means (2).

14. A drilling strainer according to claim 13, wherein said spring leaves are connected, at one of their ends, to the protective ring (16).

15. A drilling strainer comprising a number of perforated rigid tubular modules (1) connected two by two in an airtight manner end to end by ball-joint articulation means (2) that allow an extracted fluid to circulate through all of said tubular modules in series and allow said consecutive modules to move freely relative to one other in tilting travel in all directions, further comprising engagement means comprising for each pair of two consecutive modules (1, 1') of the series, complementary shapes provided at the ends respectively opposite a connecting sleeve (12) and an outside ring (6), respectively attached to the ends of said modules, (1, 1') that are designed to be articulated by said articulation means, whereby said complementary shapes are arranged so as to cooperate with one another for mutual driving in rotation when a rotational movement around its axis (X, X') is imparted on one of said modules (1, 1').

16. A drilling strainer comprising a plurality of perforated rigid tubular modules (1) connected in an airtight manner end to end by ball-joint articulation means (2) that allow an extracted fluid to circulate through all said tubular modules in series and allow said consecutive modules to move freely relative to one other in tilting travel in all directions, wherein each of said tubular modules comprises at its ends a smooth end fitting (11) not perforated, adaptable for the airtight attachment of said tubular module to different elements of said articulation means (2).

17. A drilling strainer comprising a number of perforated rigid tubular modules (1) connected two by two in an airtight manner end to end by ball-joint articulation means (2) that allow an extracted fluid to circulate through all said tubular modules in series and allow said consecutive modules to move freely relative to one other in tilting travel in all directions, wherein a cap (4) is provided to close the end of a first module adaptable to be inserted into a drilling well, so as to force said fluid to pass only into the strainer.

* * * * *